(12) United States Patent
Sivaramachandran et al.

(10) Patent No.: US 12,141,616 B2
(45) Date of Patent: Nov. 12, 2024

(54) ACCELERATED RESOURCE DISTRIBUTION IN A UNIFIED ENDPOINT MANAGEMENT SYSTEM

(71) Applicant: VMware, Inc., Palo Alto, CA (US)

(72) Inventors: Shanger Sivaramachandran, Atlanta, GA (US); Prashanth Rao, Atlanta, GA (US); Janani Vedapuri, Atlanta, GA (US); Adarsh Subhash Chandra Jain, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 700 days.

(21) Appl. No.: 17/366,006

(22) Filed: Jul. 1, 2021

(65) Prior Publication Data
US 2023/0004438 A1 Jan. 5, 2023

(51) Int. Cl.
*G06F 9/50* (2006.01)
*G06F 16/901* (2019.01)

(52) U.S. Cl.
CPC .......... *G06F 9/5044* (2013.01); *G06F 9/5011* (2013.01); *G06F 16/9014* (2019.01)

(58) Field of Classification Search
None
See application file for complete search history.

(56) References Cited

U.S. PATENT DOCUMENTS

| 11,411,816 | B1* | 8/2022 | Saluja | ............... H04L 63/20 |
| 2012/0124176 | A1* | 5/2012 | Curtis | ............... G06Q 30/0276 |
| | | | | 709/219 |
| 2021/0286758 | A1* | 9/2021 | Verma | ............... G06F 16/182 |

* cited by examiner

*Primary Examiner* — Eric C Wai
(74) *Attorney, Agent, or Firm* — Kim & Stewart LLP

(57) ABSTRACT

Systems and methods presented herein provide examples for distributing resources in a UEM system. In one example, the UEM system can receive a request to check out a user device enrolled in the UEM system. The request can include a profile identifier ("ID") of a user profile making the request and attributes of the user device. The UEM system can create a hash of group IDs associated with the profile ID. The UEM system can create a device context that includes the device attributes and the hash. The UEM system can then determine if the device context matches to a resource context. Resource contexts can identify a set of UEM resources associated with a device context. Where a match is found, the UEM system can provide the corresponding resources to the user device.

20 Claims, 4 Drawing Sheets

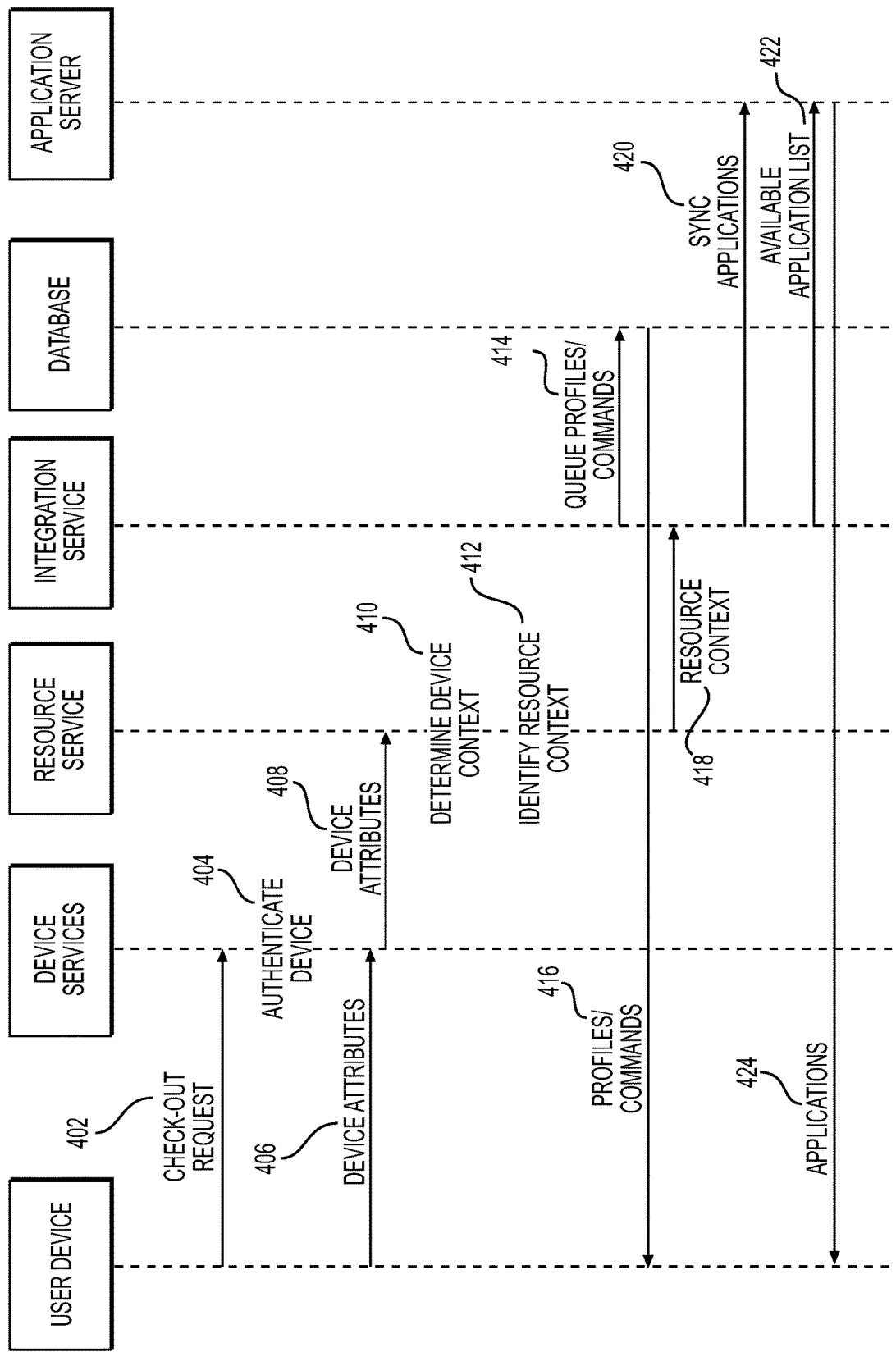

ACCELERATED RESOURCE DISTRIBUTION IN A UNIFIED ENDPOINT MANAGEMENT SYSTEM

BACKGROUND

Many organizations use Unified Endpoint Management ("UEM") systems to manage employee user devices. These UEM systems help secure internal resources and data and provide control over how the user devices are used. Some UEM systems allow user devices to be enrolled in a mode where employees can check them out for temporary use. For example, retail stores can have devices that employees can check out for performing certain job functions like reviewing inventory and checking out customers.

Current methods of checking out UEM managed devices are time consuming and waste computing resources. For example, when a user checks out a device, the UEM system has to queue the device with each service to determine whether an associated resource should be provided to the user device. Many organizations have numerous business locations in the same time zone. Because of this, the UEM system can have thousands of employees arriving to work around the same time and checking out devices. This creates a huge back log in the resource calculation process. Users often must wait up to 15 minutes or even longer while the user device is configured. Most of the configuration time is due to long system queues just trying to determine which resources to provide to the device. This backlog costs the organization thousands of dollars in wasted employee time every day.

As a result, a need exists for efficiently distributing resources in a UEM system.

SUMMARY

Examples described herein include systems and methods for distributing resources in a UEM system. In an example, the UEM system can include user devices that users, such as employees, can check out for use. The user devices can be located in various locations of an organization associated with the UEM.

In an example, users can check out a user device by logging in to the user device, or a management application on the user device, using credentials for a user profile in the UEM. When the user logs in, the user device can send attributes of the user device to the UEM system, such as a version of the management application installed on the user device, an operating system version, an enrollment mode, and a unique device identifier ("ID"). In one example, the UEM system can use the device ID to retrieve other attributes of the device previously stored when the user device was enrolled, such as a group ID assigned to the user device. The UEM system can also retrieve attributes of the user profile using a profile ID from the credentials. For example, the UEM system can retrieve group IDs of groups in the organization that the user profile is assigned to. In one example, the UEM system can hash the group IDs to create a unique group ID for the combination of groups the user profile is assigned to.

In an example, some or all the device attributes and user profile attributes can be included as device context. The UEM system can use the device context to determine UEM resources that should be provided to the user device. In one example, known device contexts can be mapped to resource contexts in the UEM system. A resource context can represent a particular set of UEM resources. When a check-out request is received from a user device, the UEM system can determine whether the device context of the check-out request is already associated with a resource context and thereby identify resources that should be provided to the user device. In an example where no such association already exists, the UEM system can go through a more extensive process of identifying which resources should be provided to the user device, such as by querying all the services that provide UEM resources to determine whether the user device should receive it. The UEM can then create a new resource context that identifies UEM resources that should be provided to any future check-out requests that match the device context. This eliminates the need to query all the UEM resource services on future requests because the combination of resources needed for the check-out request are already known.

In some examples, the UEM system can be integrated with a third party to provide resources from the third party to the user devices. In such examples, the UEM system can send instructions to a server of the third party for sending applications to the user device that are identified in the resource context. In one example, the UEM system can identify applications or services that should be made available to the user device upon request. For example, the UEM system can send the profile ID and a device ID to the third-party server and instructions to allow requests from the user device for certain applications or services based on the device ID and the profile ID. In an example, the third-party server can deny requests for applications or services not identified by the UEM system.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 4 is an illustration of a second example method for distributing resources in a UEM system.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods presented herein provide examples for distributing resources in a UEM system. In an example, the UEM system can receive a request to check out a user device enrolled in the UEM system. The request can include a profile ID of a user making the request and attributes of the user device. The UEM system can create a hash of group IDs associated with the profile ID. The UEM system can create a device context that includes the device attributes and the hash. The UEM system can then determine if the device context matches to a resource context. Resource contexts can identify a set of UEM resources associated with a device context. Where a match is found, the UEM system can provide the corresponding resources to the user device. Where a match is not found, the UEM system can create a new resource context that can be used for future check-out requests with the same device context.

Figure 1:
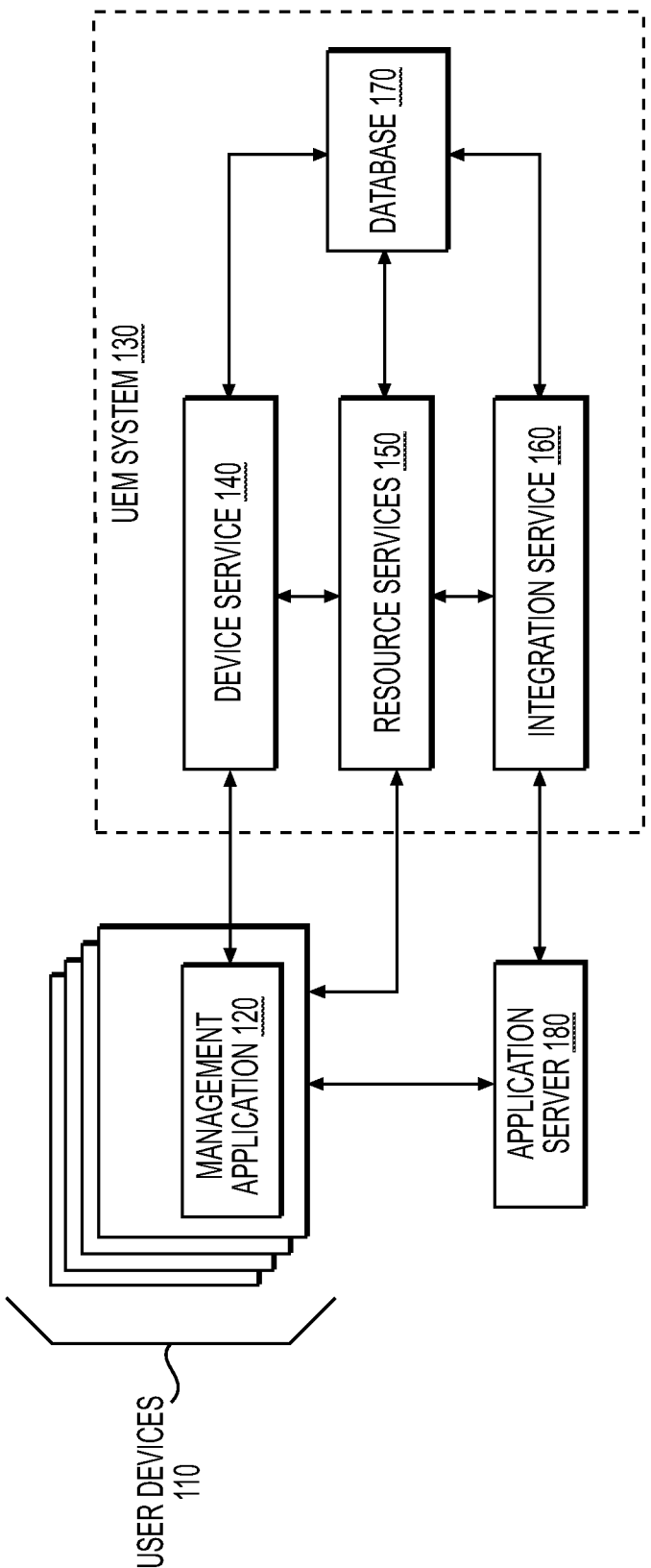
FIG. 1 is an illustration of an example system for distributing resources in a UEM system.

FIG. 1 is an illustration of a system for distributing resources in a UEM system. The system can include user devices 110 that have a management application 120. The user devices 110 can be one or more processor-based devices, such as a personal computer, tablet, or cell phone. The management application 120 can be responsible for executing certain management functions on the user devices 110. For example, the user devices 110 can be enrolled in a UEM system 130. The UEM system 130 can enforce security and compliance protocols on the user devices 110 through the management application 120.

The UEM system 130 can include one or more servers, including multiple servers implemented virtually across multiple computing platforms. The UEM system 130 can include various services for providing UEM features and resources to the user devices 110. For example, the UEM system 130 can include a device service 140 that handles enrollment and configuration of user devices. A resource service 150 can handle access and distribution of UEM resources, such as data files, profiles, and applications. An integration service 160 can handle distribution of third-party resources to the user devices 110. For example, the integration service 160 can send instructions to an application 180 to send an installation file for an application to the user devices 110. The device service 140, resource service 150, and integration service 160 (the "services") can be hosted together or separately on one or more servers of the UEM system 130.

The services 140, 150, 160 can have access to a database 170 that stores various UEM data files and resources. The database 170 can be a storage device, such as one or more database servers. In one example, the UEM system 130 can include multiple databases 170 that are responsible for storing different UEM resources. For example, one database 170 can store user profile information, such as user IDs, groups IDs, credentials, and so on. Another database 170 can store application files, such as installation and configuration files for internal UEM-controlled applications.

In an example, the user devices 110 can be enrolled as multi-user devices in the UEM system 130. For example, the user devices 110 can be enrolled in the UEM system 130, but not associated with any particular user. As an example, an administrator ("admin") user can configure the user devices 110 at a staging location. The user devices 110 can be sent to various locations where users can check them out for use at the location. In an example, a user can check out a user device 110 by logging in to it with profile credentials. The user device 110 can send the request and profile credentials over a network, such as the Internet or a Local Area Network ("LAN"). The user device 110 can send the request and credentials as a data file, such as an encrypted JavaScript Object Notation ("JSON") or an Extensible Markup Language ("XML"). In one example, the user device 110 can send the request and credentials using an Application Programming Interface ("API") call.

In one example, the profile can be specific to the user, and the user's profile can map in the UEM system 130 to group IDs of the user's roles. In a second example, users at a location can provide credentials for a profile assigned to the location. In a third example, the user can log in based on a specific role. For example, a user can use one credential if the user is checking inventory and a different credential if the user is checking out customers.

In an example, the UEM system 130 can configure the user device 110 based on the check-out request. For example, the device service 140 can receive and authenticate check-out requests. The device services 140 can also collect a device context of the user device 110. The device context can include information about certain attributes of the device, such as an organization group ID assigned to the user device 110 (referred to throughout as a "group ID" or "OGID"), a version of the management application 120 installed on the user device 110, an operating system version, an enrollment mode, and a hash of smart groups that the user profile is assigned to (referred to throughout as a "user group hash"). The OGID can signify an organization or a device group within an organization that the user device 110 is associated with. For example, an OGID can indicate a client, business location, or department. Smart groups can describe user roles (such as "associate" or "executive"), clearance levels, or work locations within an organization for the user. Smart groups can be created by an administrator and a particular smart group can have a set of resources typically needed by users in that smart group.

In an example, the device services 140 can send the device context to the resource service 150. In one example, some information related to the device context can be retrieved by the resource service 150. For example, the device services 140 can send attributes of the device and the ID of the user profile making the check-out request. The resource service 150 can query the database 170 to retrieve the user group hash of the user's profile.

In an example, the database 170 can store a table that maps device contexts to resource contexts. A resource context can identify a set of UEM resources assigned to user devices with the device context, such as commands, profiles, and applications. For example, the resources can include virtual private network ("VPN") profiles and agent files for use in managing the user device. The resource service 150 can query the database 170, such as with an API call, with the device context, and the database 170 can reply with a resource context that corresponds to the device context. The resource service 150 can then send the resources of the corresponding resource context to the user device 110. This can eliminate the need for the user device 110 to wait in queues for each resource to determine which resources are needed.

In an example, if no resource context exists in the database 170 for a device context, the resource service 150 can create one. For example, the resource service 150 can queue the user device 110 with services for the UEM resources to determine which resources are needed for the device context. After the set of resources is identified, the resource service 150 can create a resource context that identifies the resources, and the resource service 150 can map the device context to the new resource context in the database 170. Any future check-out requests that have that same device context can then map to the new resource context, thus eliminating the need to waste time and resources identifying all the resources needed to check-out the user device 110.

In an example, the UEM system 130 can include an integration service 160 that is responsible for handling any third-party applications or services associated with a device check-out. For example, the UEM system 130 can be integrated with a third-party provider so that the third-party can provide services to users of the UEM system 130 and allow the UEM system 130 to manage those services on the user devices 110. When a resource context identifies a third-party application or service, the integration service 150 can send instructions to an application server 180 of the third party to send the third-party application or service to the user device 110.

Figure 2:
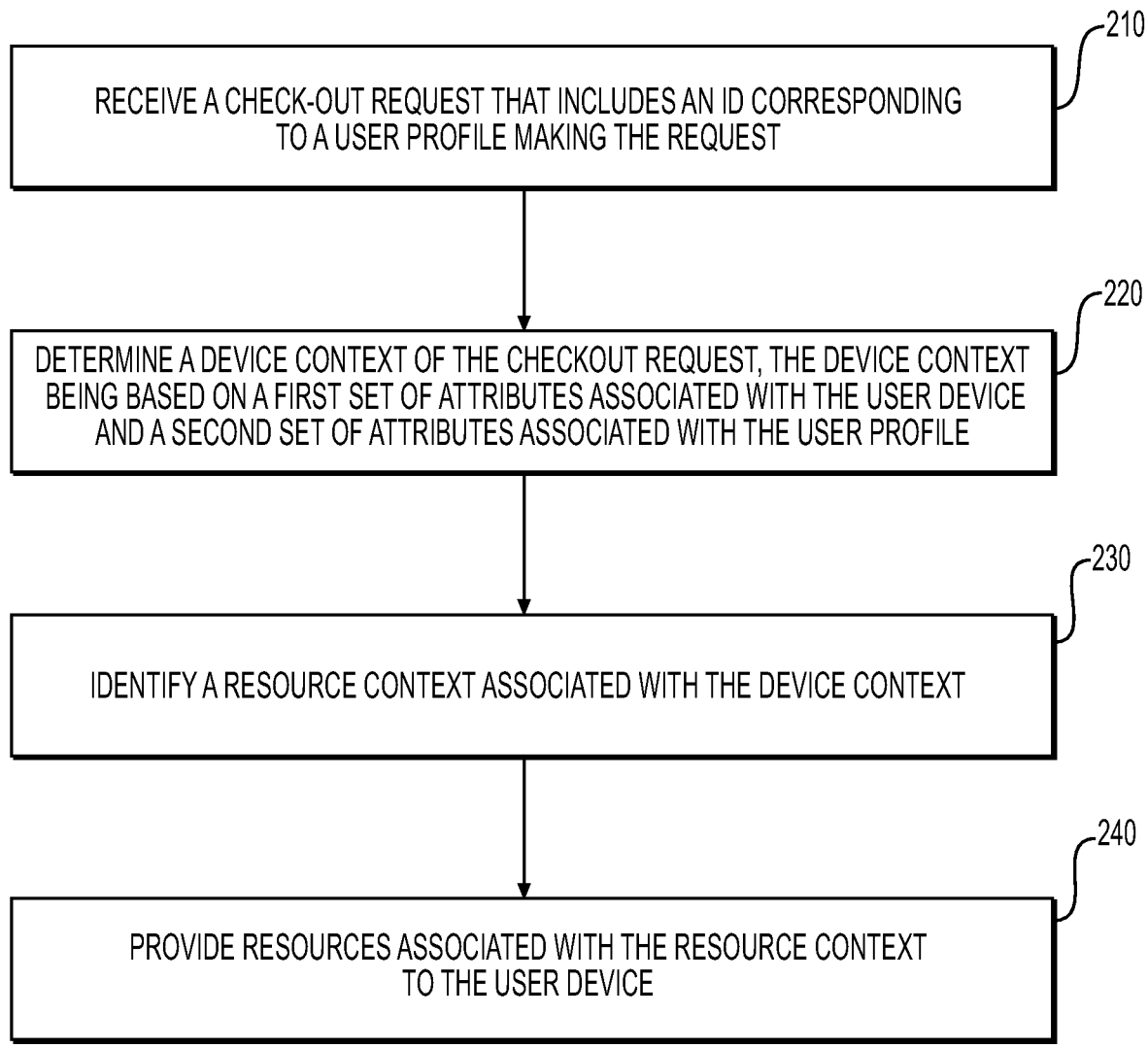
FIG. 2 is a flowchart of an example method for distributing resources in a UEM system.

FIG. 2 is a flowchart of an example method for distributing resources in a UEM system. At stage 210, the UEM system 130 can receive a check-out request from the user device 110. For example, a user can log in to the user device 110 using profile credentials. The credentials can include a username or other ID and a password associated with the profile, as an example. The user device 110 can send the credentials to the UEM system 130 where the device services 140 can authenticate the user device 110.

At stage 220, the UEM system 130 can determine a device context of the check-out request. In an example, the device context can include a first set of attributes associated with the user device 110 ("device attributes") and a second set of attributes associated with a user profile ("profile attributes") associated with the check-out request. Some examples of device attributes can include an OGID, a version of the management application 120 installed on the user device 110, an operating system version, and an enrollment mode. In an example, the user profile attributes can include smart groups that the user profile is assigned to. These groups can describe the user's role at the organization, their work location, and their security access level. The groups can each correspond to various profiles and applications that the user will need as part of their job.

In an example, attributes specific to the user device 110 can be received from the user device 110. For example, the user device 110 can provide information on the management application 120 version, the operating system version, the OGID, and the enrollment mode. In an alternative example, some attributes of the user device 110 can be determined by the UEM system 130 using a unique device ID provided by the user device 110, such as a model and serial number or an International Mobile Equipment Identity ("IMEI") number. For example, the device service 140 can use the device ID to retrieve certain attributes of the user device 110 that are saved in the database 170. The attributes saved in the database 170 can be attributes that were obtained when the user device 110 was enrolled, for example. In one example, the attributes saved at the database 170 can be attributes specific to the enrollment of the user device 110, like the OGID and the enrollment mode.

In an example, the user profile attributes can be retrieved from the UEM system 130 using the credentials provided by the user when logging in. For example, the device service 140 can send the credentials to the resource service 150. The resource service 150 can then retrieve the user profile attributes from the database 170. The user profile attributes can include group IDs that the user profile is assigned to. For example, the database 170 can store a data table that maps user IDs to group IDs for groups that the user is assigned to. The resource services 150 can query the database 170 to retrieve the groups IDs of the user profile. In one example, resource service 150 can hash the group IDs using a hash function, or alternatively group IDs can already be stored as a hash in the database 170.

At stage 230, the UEM system 130 can identify a resource context associated with the device context. In an example, a resource context can identify a set of UEM resources assigned to user devices 110 with the device context. Some examples of resources of a resource context can include commands, profiles, applications, and data files. In one example, the database 170 can store one or more data tables that map device contexts to resource contexts. User devices 110 with the same device context (i.e., the same combination of certain attributes) can be assigned to the same resource context. This allows the UEM system 130 to quickly identify all the resources a user device 110 should receive when a user checks it out.

The table below is an example data table that maps a device context to a resource context:

| Resource ID | OGID | Group Hash | OS Version | Management Application Version | Enrollment Mode |
|---|---|---|---|---|---|
| 1 | 100 | ujq/MntoIaFWWd0k0x3gi4nj rRT+A+X3/z4FeYNXcZ4= | A.11 | 2999 | 4 |
| 2 | 100 | IXfMbZo4tFR/o75Ppi8iM9/ tbF4vhVGb4vzn7da4x38= | I.10 | 2999 | 0 |

In the table above, the Resource ID column includes an ID for a specific resource context. The remaining columns illustrate device attributes that can constitute or be part of a device context. The OGID column includes the organization group ID of the user device 110, the Group Hash column includes a user group hash of the user profile user to check out the user device 110, the OS version column includes the OS version of the user device 110, the Management Application Version column includes the version of the management application 120 installed on the user device 110, and the Enrollment Mode column includes an ID for the enrollment mode of the user device 110. The OGID can represent one or more organizational groups attributed to the user device 110. The user group hash can represent groups attributed to the user based on the user profile. In the OS version column, the letter can indicate what OS platform is running on the user device 110, and the number can indicate the version. For example, the "A.11" entry can indicate that the user device 110 is running ANDROID version 11, and "I.10" can indicate that the user device 110 is running IOS version 10. The table above is merely an example, and other formats, device attributes, and user profile attributes can be used to associate a check-out request for a user device 110 with a resource context.

When a user checks out a user device 110, the UEM system 130 can compare the device context to a table like the table described above to determine whether the device context already exists and is associated with a resource context. As example, if the UEM system 130 receives a check-out request from a user device 110 and the attributes of the device context match the corresponding values in the first row of the table above, then the UEM system 130 knows the device context and that it corresponds to the resource context with the Resource ID 1.

Where the device context does match to a resource context, at stage 240, the UEM system 130 can provide resources associated with the resource context to the user device. For example, the resource service 150 can send requests to databases and servers, such as the database 170 and the application server 180, that host the resources to provide the resources to the user device 110. The databases and servers can then send the resources to the user device 110. In one example, the resources can include commands, profiles, and applications.

In an example, some resources can be provided by a third party. For example, the UEM system 130 can integrate certain third-party applications so that the application is provided by the third party but managed by the UEM system 130. In such an example, the resource service 150 can send the resource context to the integration service 160, and the integration service 160 can send a request to the application server 180 to send the third-party application to the user device 110. In this example, the application server 180 can be a third-party server.

In one example, the resource context can identify whether a resource should be provided to the user device 110 or simply made available upon request. For example, the UEM system 130 can send some applications, commands, and profiles based on the corresponding resource context. However, the resource context can identify some resources that should be made available to the user device 110, but not sent to the user device 110 unless a request is made. As an example, a user can log in to a user device 110 to check out. The UEM system 130 can send some resources immediately that the user device 110 promptly installs. The UEM system 130 can also indicate other resources that the user can request at a later time. For example, the UEM system 130 can notify the application server 180 of other applications that can be downloaded to the user device 110 upon request. If a request is received to download an application not permitted under the resource context, such a request can be denied.

In an example, the resources corresponding to the resource context can be identified using a data table. The table below illustrates an example of such a data table:

| Resource ID | ExternalAppID | InternalAppID | CommandID | ProfileID |
|---|---|---|---|---|
| 1 | 100 | Null | Null | Null |
| 1 | Null | 200 | Null | Null |
| 1 | 267 | Null | Null | Null |
| 1 | Null | Null | 7 | Null |
| 1 | Null | Null | Null | 16 |

The table above illustrates a resource context for a single resource context with a Resource ID of 1. The table includes a row for each resource that should be sent to user devices 110 with a matching device context. The table includes an ExternalAppID column that includes IDs that correspond to third-party applications, an InternalAppID column that includes IDs that correspond to internal applications, a CommandID column that includes IDs for command instructions, and a ProfileID column that includes IDs for configuration profiles. As shown above, the illustrated resource context includes two external applications: one with ID 100, and another with ID 267. When a check-out request is received and the corresponding device context matches the resource ID, the UEM system 130 can send requests to third-party servers associated with the ExternalAppIDs to send a download for the application to the user device 110. For internal resources corresponding to the InternalAppID, CommandID, and ProfileID, the UEM system 130 can queue the user device 110 with services that provide those resources. In one example, the table can include a different row for each resource, which can help reduce errors when resources are added to or removed from a resource context.

In some examples, the UEM system 130 can receive a check-out request for a user device 110, but the device context does not map to a resource context. In such an example, the UEM system 130 can create a new resource context for the device context. For example, the UEM system 130 can queue the user device 110 in the various services that provide UEM resources, which can indicate whether the user device 110 should receive the corresponding resource or not. The UEM system 130 can collect data on which resources are assigned to the user device 110 and create a new resource context based on the data. This new resource context can be used to quickly identify resources for future check-out requests that have the same device context.

Figure 3:
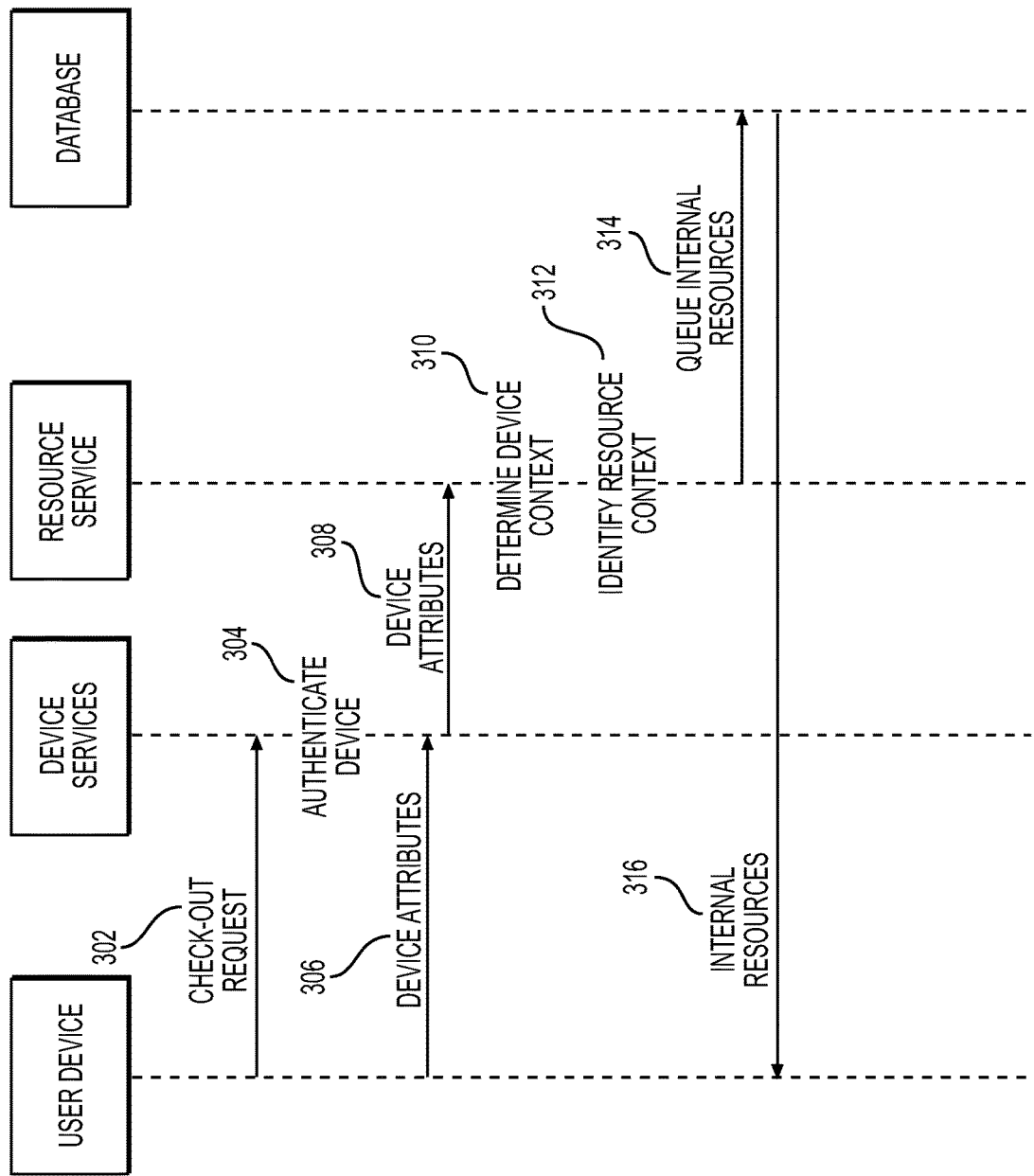
FIG. 3 is a sequence diagram of an example method for distributing resources in a UEM system.

FIG. 3 is a sequence diagram of an example method for distributing resources in the UEM system 130. At stage 302, the user device 110 can send a check-out request to the device services 140. For example, a user can log in to the user device 110 using profile credentials. In one example, logging in to the device can include logging in to the management application 120. The credentials can include a username or ID and a password associated with the profile, as an example. At stage 304, the device services 140 can authenticate the user device 110.

At stage 306, the user device 110 can send device attributes to the device services 140. In one example, the user device 110 can send the device attributes in response to a request from the device services 140. Alternatively, the management application 120 can be configured to send the device attributes with the check-out request. In one example, the device attributes can include an OGID, a management application 120 version, a operating system version, and an enrollment mode. At stage 308, the device services 140 can send the device attributes to the resource service 150.

At stage 310, the resource service 150 can determine a device context of the user device 110 based on user and device attributes. In one example, this can include obtaining a user group hash associated with the user profile making the check-out request. For example, the database 170 can store a table that maps user profile IDs to group IDs of smart groups that the user is assigned to. In one example, the user profile IDs can map to a user group hash of the user profile. The resource service 150 can send a query with the user profile ID to the database 170 and the database 170 can respond with the corresponding group IDs. In one example, the database 170 can send the group IDs as a user group hash. Alternatively, the resource service 150 can hash the group IDs to create the user group hash. In an example, the combination of the device attributes and the user group hash can constitute or be part of the device context.

At stage 312, the resource service 150 can identify a resource context associated with the device context. For example, the resource service 150 can access a data table that matches a device context to a resource ID that corresponds to a particular resource context. The resource context can identify UEM resources assigned to user devices 110 checked out with a corresponding device context.

At stage 314, the resource service 150 can queue deployment of resources with the database 170. The database 170 can include one or more databases and servers that host UEM resources. The resource service 150 can queue deployment of resources at their corresponding servers or databases.

At stage 316, the database 170 can send the resources to the user device 110. For example, the database 170, and any other servers or devices in the UEM system 130, can download their respective resources to the user device 110. The user device 110 can then install the resources. For example, the user device 110 can install a configuration profile to configure the user device 110 according to the check-out request. The user device 110 can also install and configure any applications received.

In an example of the method described above, if the resource service 150 cannot identify a resource context at stage 312, the resource service 150 can user an alternate method to identify resources. For example, the resource service 150 can query the UEM services of the resources to determine whether the user device 110 should receive the service's resource. Based on the responses, the resource service 150 can create a new resource context, such as by adding an entry in a data table that stores the resource context and device context data. The resource service 150 can then queue the resources to deploy to the user device 110. When a future check-out request is received with the same device context, the resource service 150 can identify the needed resources using the resource context instead of querying the resource services.

FIG. 4 is an illustration of a second example method for distributing resources in the UEM system 130 that includes distributing third-party resources. At stage 402, the user device 110 can send a check-out request to the device services 140. For example, a user can log in to the user device 110 using profile credentials. In one example, logging in to the device can include logging in to the management application 120. The credentials can include a username or ID and a password associated with the profile, as an example. At stage 404, the device services 140 can authenticate the user device 110.

At stage 406, the user device 110 can send device attributes to the device services 140. In one example, the user device 110 can send the device attributes in response to a request from the device services 140. Alternatively, the management application 120 can be configured to send the device attributes with the check-out request. In one example, the device attributes can include an OGID, a management application 120 version, an operating system version, and an enrollment mode. At stage 408, the device services 140 can send the device attributes to the resource service 150.

At stage 410, the resource service 150 can determine a device context of the user device 110. In one example, this can include obtaining a user group hash associated with the user profile making the check-out request. For example, the database 170 can store a table that maps user profile IDs to group IDs of groups that the user is assigned to. The resource service 150 can send a query with the user profile ID to the database 170 and the database 170 can respond with the corresponding group IDs. In one example, the database 170 can send the group IDs as a user group hash. Alternatively, the resource service 150 can hash the group IDs to create the user group hash. In an example, the combination of the device attributes and the user group hash can constitute or be part of the device context.

At stage 412, the resource service 150 can identify a resource context associated with the device context. For example, the resource service 150 can access a data table that matches a device context to a resource ID that corresponds to a particular resource context. The resource context can identify UEM resources assigned to user devices 110 checked out with a corresponding device context.

At stage 414, the integration service 160 can queue deployment of internal resources with the database 170. The database 170 can include one or more databases and servers that host internal UEM resources, such as internal applications, commands, and profiles. The resource service 150 can queue deployment of the internal resources at their corresponding servers or databases.

At stage 416, the database 170 can send the internal resources to the user device 110. For example, the database 170, and any other servers or devices in the UEM system 130, can download their respective resources to the user device 110. The user device 110 can then install the resources. For example, the user device 110 can install a configuration profile to configure the user device 110 according to the check-out request. The user device 110 can also install and configure any applications received.

At stage 418, the resource service 150 can send the resource context to the integration service 160. The integration service can be responsible for handling any third-party applications or services associated with a device check-out. At stage 420, the integration service 160 can sync application from the resource context with the application server 180. For example, the application server 180 can be a third-party server, and the integration service 160 can send IDs of applications from the resource context and instructions to send download files of the application to the user device 110.

At stage 422, the integration service 160 can send a list of applications to the external application server 180 that the user device 110 is authorized to download. The integration service 160 can do this if there are applications in the resource context that the user device 110 has access to based on the device context but does not need to be immediately downloaded to the user device 110. If the user later requests such an application, the third-party application server 180 can then send the installation file. If the user device 110 requests an application that is not synced, then the request would be denied by the application server 180.

At stage 424, the external application server 180 can send the synced applications to the user device 110. For example, the application server 180 can send an installation file for any applications identified in the resource context. The user device 110 can then install the third-party applications.

In an example of the method described above, if the resource service 150 cannot identify a resource context at stage 412, the resource service 150 can user an alternate method to identify resources. For example, the resource service 150 can query the UEM services of the resources to determine whether the user device 110 should receive the service's resource. Based on the responses, the resource service 150 can create a new resource context, such as by adding an entry in a data table that stores the resource context and device context data. The resource service 150 can then queue the resources to deploy to the user device 110. When a future check-out request is received with the same device context, the resource service 150 can identify the needed resources using the resource context instead of querying the resource services.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for distributing resources in a Unified Endpoint Management (UEM) system, comprising:
   receiving, at a device service of the UEM system from a user device, a check-out request that includes an identifier ("ID") corresponding to a user profile making the request, and a set of attributes associated with the user device;
   communicating the user profile and the set of attributes from the device service to a resource service of the UEM system;
   communicating between the resource service and a database of the UEM system to send resources associated with a resource context to the user device, the resource context associated with a device context, the resource context identifying the resources assigned to user devices with the device context, the device context determined for the check-out request based on the set of attributes and a hash, the hash determined from at least one group ID associated with the user profile; and
   installing, at the user device, the resources.

2. The method of claim 1, wherein the set of resources includes at least a configuration profile and an application.

3. The method of claim 1, wherein the set of attributes includes at least an organization group ID associated with the user device, a version of a management application installed on the user device, and an enrollment mode.

4. The method of claim 1, wherein the resources associated with the resource context include a third-party application, and providing the resources associated with the resource context includes sending instructions to a third-party server of the third-party application to download the third-party application to the user device.

5. The method of claim 1, wherein, in an instance where a resource context associated with the device context cannot be identified, the stages further comprise:
   determining a new set of resources based on the device context;
   creating a new resource context that identifies the new set of resources assigned to user devices with the device context; and
   mapping the device context to the new resource context in a data table.

6. The method of claim 5, further comprising providing the new set of resources to user devices that send a check-out request and have the same device context.

7. The method of claim 1, further comprising:
   determining, based on the resource context, a third-party application that the user profile is authorized to install;
   sending, to a server associated with the third-party application, instructions to allow the user device to download the third-party application.

8. A non-transitory, computer-readable medium containing instructions that, when executed by a hardware-based processor, performs stages for distributing resources in a Unified Endpoint Management (UEM) system, the stages comprising:
   receiving, at a device service of the UEM system from a user device, a check-out request that includes an identifier ("ID") corresponding to a user profile making the request, and a set of attributes associated with the user device;
   communicating the user profile and the set of attributes from the device service to a resource service of the UEM system;
   communicating between the resource service and a database of the UEM system to send resources associated with a resource context to the user device, the resource context associated with a device context, the resource context identifying the resources assigned to user devices with the device context, the device context determined for the check-out request based on the set of attributes and a hash, the hash determined from at least one group ID associated with the user profile; and
   installing, at the user device, the resources.

9. The non-transitory, computer-readable medium of claim 8, wherein the set of resources includes at least one of a configuration profile and an application.

10. The non-transitory, computer-readable medium of claim 8, wherein the set of attributes includes at least an organization group ID associated with the user device, a version of a management application installed on the user device, and an enrollment mode.

11. The non-transitory, computer-readable medium of claim 8, wherein the resources associated with the resource context include a third-party application, and providing the resources associated with the resource context includes sending instructions to a third-party server of the third-party application to download the third-party application to the user device.

12. The non-transitory, computer-readable medium of claim 8, wherein, in an instance where a resource context associated with the device context cannot be identified, the stages further comprise:
   determining a new set of resources based on the device context;
   creating a new resource context that identifies the new set of resources assigned to the user devices with the device context; and
   mapping the device context to the new resource context in a data table.

13. The non-transitory, computer-readable medium of claim 8, the stages further comprising providing the new set of resources to user devices that send a check-out request and have the same device context.

14. The non-transitory, computer-readable medium of claim 8, the stages further comprising:
   determining, based on the resource context, a third-party application that the user profile is authorized to install;
   sending, to a server associated with the third-party application, instructions to allow the user device to download the third-party application.

15. A system for distributing resources in a Unified Endpoint Management (UEM) system, comprising:
   a memory storage including a non-transitory, computer-readable medium comprising instructions; and
   a computing device including a hardware-based processor that executes the instructions to carry out stages comprising:
      receiving, at a device service of the UEM system from a user device, a check-out request that includes an identifier ("ID") corresponding to a user profile making the request, and a set of attributes associated with the user device;

communicating the user profile and the set of attributes from the device service to a resource service of the UEM system;

communicating between the resource service and a database of the UEM system to send resources associated with a resource context to the user device, the resource context associated with a device context, the resource context identifying the resources assigned to user devices with the device context, the device context determined for the check-out request based on the set of attributes and a hash, the hash determined from at least one group ID associated with the user profile; and installing, at the user device, the resources.

16. The system of claim 15, wherein the set of resources includes at least a configuration profile and an application.

17. The system of claim 15, wherein the set of attributes further at least an organization group ID associated with the user device, a version of a management application installed on the user device, and an enrollment mode.

18. The system of claim 15, wherein the resources associated with the resource context include a third-party application, and providing the resources associated with the resource context includes sending instructions to a third-party server of the third-party application to download the third-party application to the user device.

19. The system of claim 15, wherein, in an instance where a resource context associated with the device context cannot be identified, the stages further comprise:

determining a new set of resources based on the device context;

creating a new resource context that identifies the new set of resources assigned to the user devices with the device context; and mapping the device context to the new resource context in a data table.

20. The system of claim 15, the stages further comprising providing the new set of resources to user devices that send a check-out request and have the same device context.

* * * * *